(12) United States Patent
Yoshimura et al.

(10) Patent No.: US 9,501,282 B2
(45) Date of Patent: Nov. 22, 2016

(54) ARITHMETIC PROCESSING DEVICE

(71) Applicant: FUJITSU LIMITED, Kawasaki-shi, Kanagawa (JP)

(72) Inventors: Kazuhiro Yoshimura, Kawasaki (JP); Yi Ge, Bunkyo (JP); Kazuo Horio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 153 days.

(21) Appl. No.: 14/186,095

(22) Filed: Feb. 21, 2014

(65) Prior Publication Data
US 2014/0317164 A1 Oct. 23, 2014

(30) Foreign Application Priority Data

Apr. 22, 2013 (JP) ................................ 2013-089479

(51) Int. Cl.
*G06F 7/38* (2006.01)
*G06F 9/38* (2006.01)

(52) U.S. Cl.
CPC ............ *G06F 9/383* (2013.01); *G06F 9/3824* (2013.01); *G06F 9/3877* (2013.01)

(58) Field of Classification Search
None
See application file for complete search history.

(56) References Cited

U.S. PATENT DOCUMENTS

| 6,003,124 A | 12/1999 | Laborie | |
| 6,526,430 B1* | 2/2003 | Hung | G06F 7/544 |
| | | | 375/E7.026 |
| 8,438,208 B2* | 5/2013 | Olson | G06F 7/4876 |
| | | | 708/490 |
| 2010/0325188 A1* | 12/2010 | Olson | G06F 7/4876 |
| | | | 708/625 |
| 2011/0029757 A1 | 2/2011 | Nakajima | |
| 2014/0108481 A1* | 4/2014 | Davis | G06F 17/16 |
| | | | 708/607 |
| 2014/0317164 A1* | 10/2014 | Yoshimura | G06F 9/3824 |
| | | | 708/521 |

FOREIGN PATENT DOCUMENTS

| JP | 8-69377 | 3/1996 |
| JP | 2011-34189 | 2/2011 |
| JP | 2011-197774 | 10/2011 |

OTHER PUBLICATIONS

Chinese Office Action issued Apr. 28, 2016 in corresponding Chinese Patent Application No. 201410100282.2.
Japanese Office Action issued Aug. 23, 2016 in corresponding Japanese Patent Application No. 2013-089479.

\* cited by examiner

*Primary Examiner* — David H Malzahn

(57) ABSTRACT

An arithmetic processing device includes: an arithmetic unit configured to execute an arithmetic operation; and a stream engine configured to execute stream processing, wherein a data bus of the arithmetic unit and a data bus of the stream engine are tightly coupled with each other.

12 Claims, 17 Drawing Sheets

ARITHMETIC PROCESSING DEVICE

CROSS-REFERENCE TO RELATED APPLICATION

This application is based upon and claims the benefit of priority of the prior Japanese Patent Application No. 2013-089479 filed on Apr. 22, 2013, the entire contents of which are incorporated herein by reference.

FIELD the embodiment discussed herein is related to an arithmetic processing device.

BACKGROUND

In recent years, with an increase in the amount of communication of portable terminals, such as smartphones and tablet computers, higher-speed wireless communication systems have been attracting attention. As such a high-speed wireless communication system, for example, Long Term Evolution (LTE) has been in widespread use, and LTE Advanced, which is a higher-performance next-generation mobile communications system, has been standardized and various proposals are being made for practical use.

For example, when LTE Advanced is employed, an enormous amount of matrix arithmetic operation processing is to be performed as wireless-communication baseband processing. This is not only limited to LTE Advanced, but is also true for various wireless communication systems (standards) including Worldwide Interoperability for Microwave Access 2 (WiMAX 2) and currently used systems.

In general, in wireless-communication baseband processing, an enormous amount of matrix arithmetic operation is performed in proportion to an increase in communication speed. For example, in LTE Advanced, the matrix arithmetic operation accounts for a large amount of the entire arithmetic operation.

A configuration in which a memory in which matrix data is stored and an arithmetic unit are connected in series and a stream engine performs matrix arithmetic operation on data read from the memory and writes out an arithmetic-operation result to the memory is suitable, in order to execute matrix arithmetic operation processing (one type of stream processing) at high speed.

Accordingly, for example, a combination of a base processor, which is a general-purpose processor, and a coprocessor having a stream engine has been proposed as an arithmetic processing device (an arithmetic processing system) for performing wireless-communication baseband processing in LTE Advanced.

Heretofore, various systems have been proposed as an arithmetic processing system realized by a combination of a base processor and a coprocessor having a stream engine.

Examples of related art include the technologies disclosed in Japanese Laid-open Patent Publication No. 2011-197774 and Japanese Laid-open Patent Publication No. 08-069377.

In such an arithmetic processing system, for example, when a stream instruction, which is a coprocessor instruction, is executed, the base processor performs state-monitor of the coprocessor, transfer of data, control of the execution, and so on through handshaking. Consequently, overhead occurs. This overhead is referred to as, for example, "communication cycle overhead".

In addition, for example, when an interrupt occurs while the stream engine in the coprocessor is executing stream processing, interrupt processing is performed after waiting until the execution of the stream processing is completed.

That is, when the coprocessor is in a busy state during occurrence of an interrupt, the base processor waits until the coprocessor enters an idle state. This further increases the communication cycle overhead.

SUMMARY

An object of the embodiments is providing a combination of a base processor and a coprocessor having a stream engine for an arithmetic processing system for performing wireless-communication baseband processing.

According to an aspect of the invention, an arithmetic processing device includes: an arithmetic unit configured to execute an arithmetic operation; and a stream engine configured to execute stream processing, wherein a data bus of the arithmetic unit and a data bus of the stream engine are tightly coupled with each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

First, before an embodiment of an arithmetic processing device is described in detail, an example of an arithmetic processing device and a problem thereof will be described with reference to FIG. 1.

Figure 1:
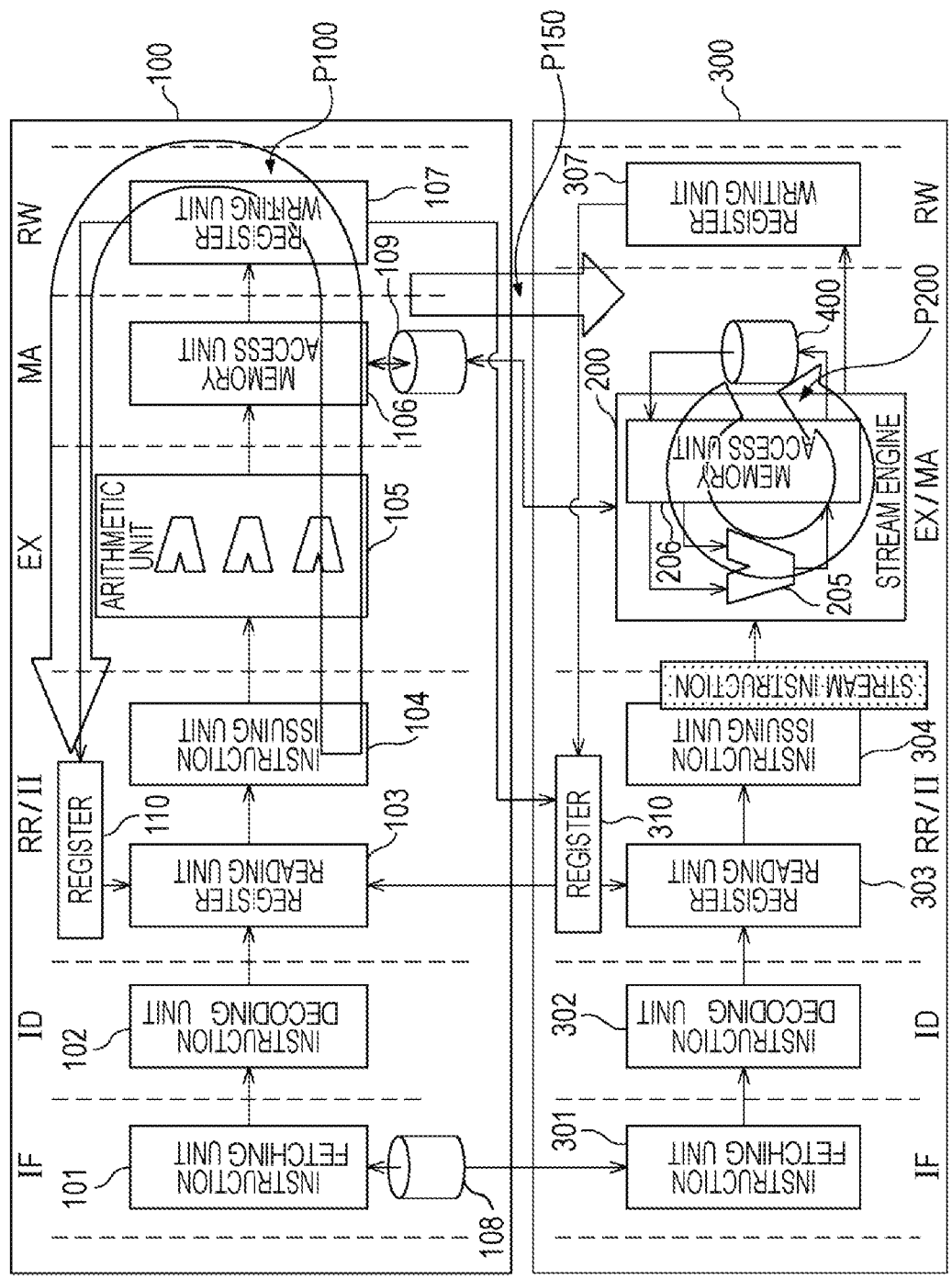
FIG. 1 is a block diagram illustrating an example of an arithmetic processing device.

FIG. 1 is a block diagram illustrating an example of an arithmetic processing device. The illustrated arithmetic processing device (arithmetic processing system) is a combination of a base processor, which is a general-purpose processor, and a coprocessor having a stream engine.

In FIG. 1, reference character IF indicates an instruction fetching (Instruction Fetch) stage, ID indicates an instruction decoding (Instruction Decode) stage, and RR/II indicates a register reading (Register Read) stage and an instruction issuing (Instruction Issue) stage.

Reference character EX indicates an execution (EXecution) stage, MA indicates a memory access (Memory Access) stage, and RW indicates a register writing (Register Write) stage. The arithmetic processing system illustrated in FIG. 1 has, for example, a base processor 100, which is a general-purpose processor, and a coprocessor 300, which includes a stream engine 200.

In the base processor 100, in the IF stage, an instruction fetching unit 101 fetches (reads) an instruction from an instruction memory 108, and in the ID stage, an instruction decoding unit 102 receives the instruction read by the instruction fetching unit 101 and decodes (interprets) the instruction.

In the RR/II stage, a register reading unit 103 performs reading from a register 110, and an instruction issuing unit 104 issues the instruction interpreted by the instruction decoding unit 102 to an arithmetic unit 105.

In the EX stage, the arithmetic unit 105 executes an arithmetic operation according to the instruction issued by the instruction issuing unit 104, and in the MA stage, a memory access unit 106 makes access, involving load (read) or store (write), to a memory (data memory) 109.

In the RW stage, a register writing unit 107 writes, to the register 110, an arithmetic-operation result obtained by the arithmetic unit 105 or data loaded from the data memory 109.

As indicated by reference character P100 in FIG. 1, the base processor 100 is adapted to perform pipeline execution, regarding processing between the register 110 and the memory 109 or between the register 110 and the arithmetic unit 105 as processing according to a single instruction.

In the coprocessor 300, in the IF stage, an instruction fetching unit 301 reads an instruction from the instruction memory 108, and in the ID stage, an instruction decoding unit 302 reads and interprets the instruction read by the instruction fetching unit 301.

In the RR/II stage, a register reading unit 303 performs reading from a register 310, and an instruction issuing unit 304 issues the instruction interpreted by the instruction decoding unit 302 to the stream engine 200. The stream engine 200 includes an arithmetic unit 205 and a memory access unit 206, which makes access, involving load or store, to a data memory 400.

As indicated by reference character P200 in FIG. 1, the instruction from the instruction issuing unit 304 to the stream engine 200 is a stream instruction. When one stream instruction is issued, pipeline execution is performed until one sequence of stream processing between the memory 400 and the arithmetic unit 205 is completed.

That is, in the EX and MA stage, the arithmetic unit 205 and the memory access unit 206 in the stream engine 200 perform processing until the stream processing is completed, in accordance with a stream instruction issued from the instruction issuing unit 304. In the RW stage, a register writing unit 307 writes data (an arithmetic-operation result), subjected to the stream processing by the stream engine 200, to the register 310.

In this case, in FIG. 1, reference character P150 indicates processing that the base processor 100 performs on the coprocessor 300, for example, processing for handshaking with the coprocessor 300 by issuing a stream instruction to the coprocessor 300. That is, the base processor 100 monitors, for example, the state of the coprocessor 300, controls execution of the coprocessor 300, and controls data transfer to the coprocessor 300.

The arithmetic processing system, which is a combination of the base processor 100 and the coprocessor 300 having the stream engine 200, described above with reference to FIG. 1 has a problem of cycle overhead when the stream engine 200 executes stream processing.

That is, during execution of a stream instruction, which is a coprocessor instruction, the base processor 100 monitors the state of the coprocessor 300 through handshaking to perform data transfer with the coprocessor 300 and controls execution of the coprocessor 300.

Thus, overhead (communication cycle overhead) occurs between the base processor 100 and the coprocessor 300. For example, when an interrupt occurs while the stream engine 200 in the coprocessor 300 is executing stream processing, the stream engine 200 waits until the execution of the stream processing is completed, and thus the communication cycle overhead further increases.

Figure 2:
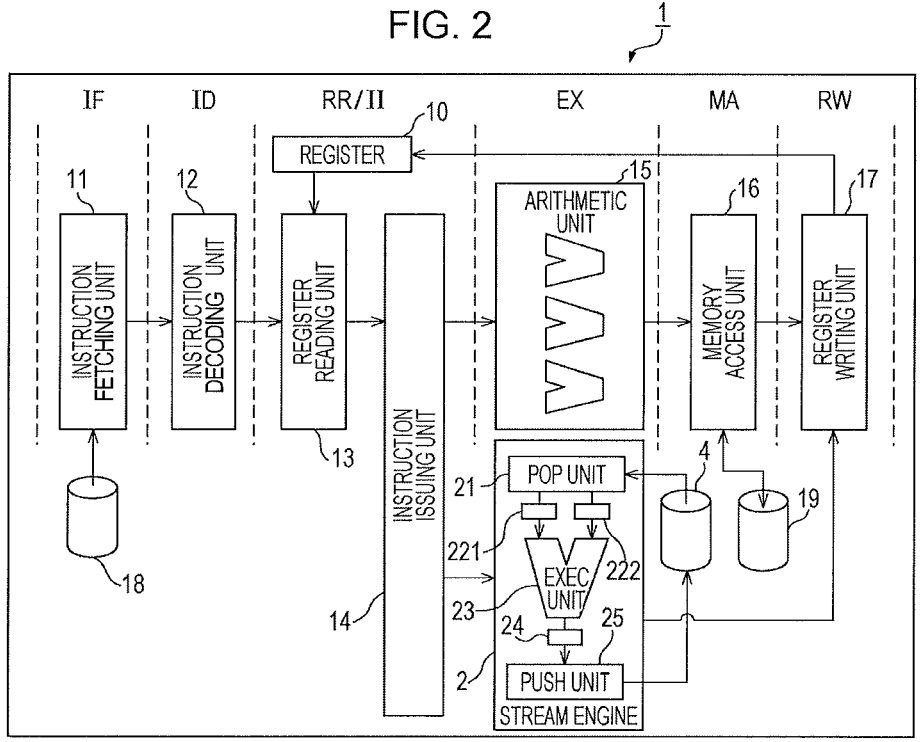
FIG. 2 is a block diagram illustrating an example of the arithmetic processing device according to the present embodiment.

The arithmetic processing device according to the present embodiment will be described below in detail with reference to the accompanying drawings. FIG. 2 is a block diagram illustrating an example of the arithmetic processing device according to the present embodiment. As is apparent from comparison between FIG. 2 and FIG. 1, an arithmetic processing device (processor) 1 illustrated in FIG. 2 includes a configuration corresponding to the base processor 100 illustrated in FIG. 1 and further includes a stream engine 2.

More specifically, as illustrated in FIG. 2, the processor 1 includes a register 10, an instruction fetching unit 11, an instruction decoding unit 12, a register reading unit 13, an instruction issuing unit 14, an arithmetic unit 15, a memory access unit 16, a register writing unit 17, an instruction memory 18, and a data memory 19. The instruction issuing unit 14 is adapted to not only issue instructions to the arithmetic unit 15, but also issue instructions (for example, step instructions) to the stream engine 2.

The stream engine 2 includes a pop unit 21 and an exec unit 23. The pop unit 21 reads data from a data memory 4 and writes the read data to registers 221 and 222, and the exec unit 23 executes stream processing on the data written to the registers 221 and 222 and writes the resulting data to a register 24. The stream engine 2 further includes a push unit 25 that writes the data, written to the register 24, to the data memory 4.

In FIG. 2, reference characters IF, ID, RR/II, EX, MA, and RW indicate stages that are the same as or similar to those described above with reference to FIG. 1.

That is, in the IF stage, the instruction fetching unit 11 fetches (reads) an instruction from the instruction memory 18, and in the ID stage, the instruction decoding unit 102 receives the instruction fetched by the instruction fetching unit 101 and decodes (interprets) the instruction.

In the RR/II stage, the register reading unit 13 performs reading from the register 10, and the instruction issuing unit 14 issues the instruction, interpreted by the instruction decoding unit 12, to the arithmetic unit 15 and the stream engine 2.

In the EX stage, the arithmetic unit 15 executes an arithmetic operation according to the instruction issued from the instruction issuing unit 14, and the stream engine 2 executes stream processing according to the instruction issued from the instruction issuing unit 14. In this case, the instructions issued from the instruction issuing unit 14 to the stream engine 2 are step instructions, as described above.

In the MA stage, the memory access unit 16 makes access, involving load or store, to the memory (data memory) 19. In addition, in the MA stage, the stream engine 2 (the pop unit 21 or the push unit 25) makes access, involving load (read) or store (write), to the memory (data memory) 4.

In the RW stage, the register writing unit 17 writes an arithmetic-operation result, obtained by the arithmetic unit 15, or data, loaded from the data memory 19, to the register 10, and the register writing unit 17 writes the data, subjected to the stream processing executed by the stream engine 2, to the register 10.

Figure 3:
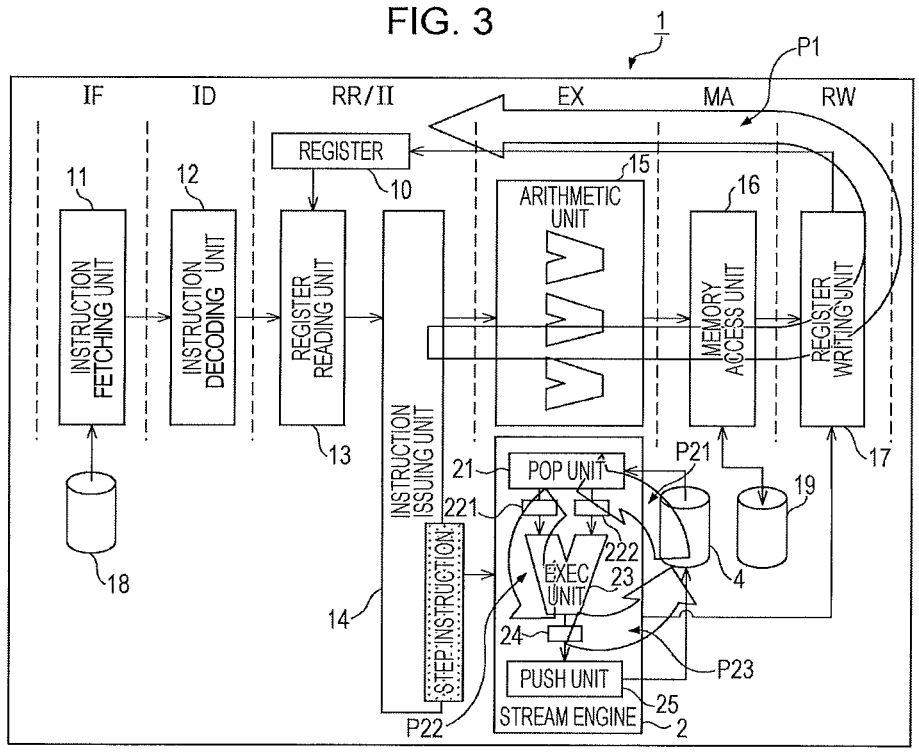
FIG. 3 is a block diagram illustrating an operation performed by the arithmetic processing device according to the present embodiment.

FIG. 3 is a block diagram illustrating an operation performed by the arithmetic processing device 1 according to the present embodiment. As is apparent from comparison between reference character P1 illustrated in FIG. 3 and reference character P100 illustrated in FIG. 1, pipeline execution is performed regarding processing between the register 10 and the memory 19 or the register 10 and the arithmetic unit 15 as processing according to a single instruction in a portion corresponding to the base processor 100 illustrated in FIG. 1.

As indicated by reference characters P21 to P23 in FIG. 3, the stream engine 2, which is built into the processor 1, executes processes for the respective steps in accordance with step instructions issued from the instruction issuing unit 14.

In this case, the process P21 is a process in which the pop unit 21 in the stream engine 2 reads data from the data memory 4 and writes the read data to the registers 221 and 222. The process P22 is a process in which the exec unit 23 executes stream processing on the data written to the registers 221 and 222 and writes the resulting data to the register 24.

In addition, the process P23 is a process in which the push unit 25 writes the data, written to the register 24, to the data memory 4. The processes P21 to P23 are subjected to pipeline execution according to step instructions issued from the instruction issuing unit 14.

Herein, a description will be given of a case in which the stream engine 2 processes the three processes P21 to P23 in accordance with three step instructions (one rotation with three step instructions). However, this is merely an example, and it goes without saying that the arrangement may be such that processes of one rotation are constituted by four or more processes and the processes of one rotation are repeated a large number of times to execute stream processing.

Figure 4:
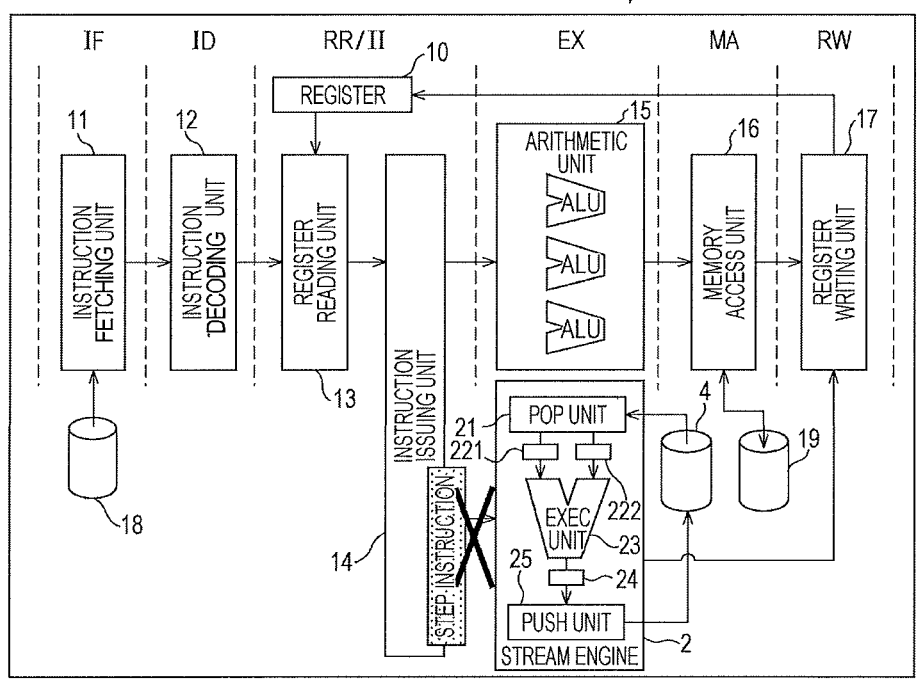
FIG. 4 is a block diagram illustrating an operation of stopping a stream engine in the arithmetic processing device according to the present embodiment.

FIG. 4 is a block diagram illustrating an operation of stopping the stream engine 2 in the arithmetic processing device 1 according to the present embodiment. For example, when an interrupt occurs while the stream engine 2, built into the processor 1, is executing stream processing, the instruction issuing unit 14 stops the issuance of the step instructions to the stream engine 2.

When the instruction issuing unit 14 stops the issuance of the step instructions to the stream engine 2, all of the processes P21 to P23 in the stream engine 2 are stopped. That is, the pop unit 21 stops the process P21 in which data is read from the data memory 4 and the read data is written to the registers 221 and 222.

The exec unit 23 also stops the process P22 in which the stream processing is executed on the data written to the registers 221 and 222 and the resulting data is written to the register 24. The push unit 25 then stops the process P23 in which the data written to the register 24 is written to the data memory 19.

As described above, the arithmetic processing device according to the present embodiment performs fine-grained control on the operation of the stream engine 2 in accordance with the step instructions. Thus, when an interrupt occurs during execution of stream processing, the arithmetic processing device can perform interrupt processing by immediately stopping the stream processing.

That is, according to the arithmetic processing device according to the present embodiment, for example, it is possible to immediately stop the stream engine 2 by stopping the issuance of the step instructions during occurrence of an interrupt. In other words, according to the arithmetic processing device according to the present embodiment, after the issuance of step instructions is stopped, the pipeline stages (processes P21 to P23) in the stream engine 2 can autonomously be stopped, thus making it possible to reduce the cycle overhead and to increase the processing speed.

Figure 5A:
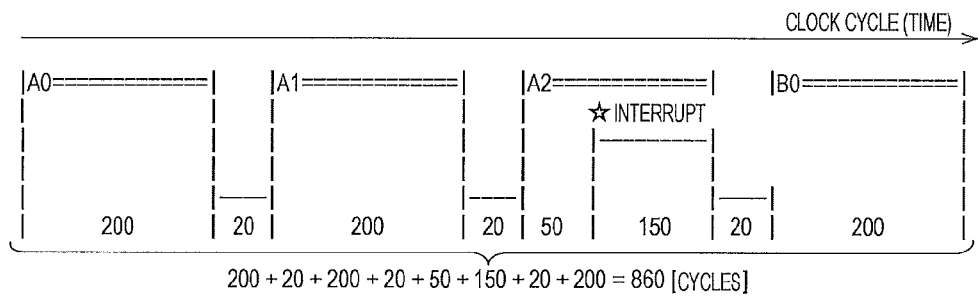
FIGS. 5A and 5B are diagrams illustrating an example of an advantage resulting from the stopping operation of the stream engine, the stopping operation being described with reference to FIG. 4.
Figure 5B:
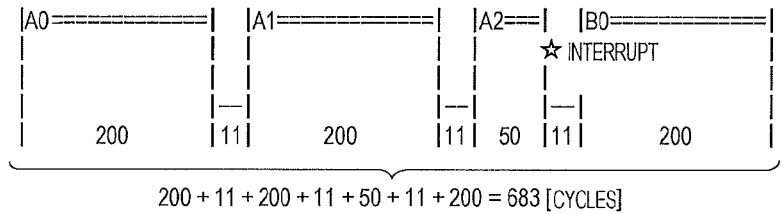

FIGS. 5A and 5B are diagrams illustrating an example of an advantage resulting from the stopping operation of the stream engine 2, the stopping operation being described above with reference to FIG. 4. More specifically, FIG. 5A illustrates an operation performed by the arithmetic processing system described above illustrated in FIG. 1, and FIG. 5B illustrates an operation performed by the arithmetic processing device described above with reference to FIG. 4.

As a premise, it is assumed that the number of cycles (the number of clock cycles) of one sequence of stream processing is 200 cycles, latency of an arithmetic-operation data bus is 10 cycles, and the bit width of parameter information used for one sequence of stream processing is 320 bits.

It is also assumed that data transfer between the outside and the memory 19 performs overlapping operation with the stream processing and a data transfer cycle is hidden. In addition, it is also assumed that, in FIG. 5A, a data bus between the base processor 100 and the coprocessor 300 is a 32-bit data bus and the parameter information is transferred from the base processor 100 to the coprocessor 300 at 10 cycles.

Thus, in FIG. 5A, communication cycle overhead is given by, for example, 10 [cycles] (data transfer)+10 [cycles] (arithmetic-operation data bus)=20 [cycles].

In FIG. 5B, since the data bus is "tightly coupled", the parameter information is assumed to be transferred at 1 cycle. The term "tight coupling" as used herein does not mean that processors coupled at a bus level access a common memory, and means that the common instruction issuing unit 14 issues an instruction to the arithmetic unit 15 and the stream engine 2.

Thus, in FIG. 5B, the communication cycle overhead is given by, for example, 1 [cycle] (data transfer)+10 [cycles] (arithmetic-operation data bus)=11 [cycles].

As illustrated in FIG. 5A, in the arithmetic processing system illustrated in FIG. 1, for example, when an interrupt occurs at the 50th cycle in third stream processing (A2), other stream processing (B0) is executed after all of the third stream processing is completed.

Accordingly, in the arithmetic processing system, 200+20+200+20+50+150+20+200=860 [cycles] is involved until the other stream processing (B0) is completed.

On the other hand, in the arithmetic processing device (processor) 1 in the embodiment described above with reference to FIG. 4, for example, when an interrupt occurs at the 50th cycle in the third stream processing (A2), the third stream processing is immediately stopped and the stream processing (B0) is executed.

Accordingly, the processor 1 in the present embodiment involves 200+11+200+11+50+11+200=683 [cycles] until the other stream processing (B0) is completed.

That is, it can be understood that, for performing the same processing, the processor 1 in the present embodiment allows the processing speed to be increased from 860 cycles to 683 cycles by 177 cycles.

FIGS. 5A and 5B illustrate merely an example of stream processing, and it goes without saying that, for example, the larger the number of cycles according to one stream instruction is or the higher the frequency of occurrence of an interrupt during execution of stream processing is, the greater the advantage of increasing the processing speed becomes.

Figure 6:
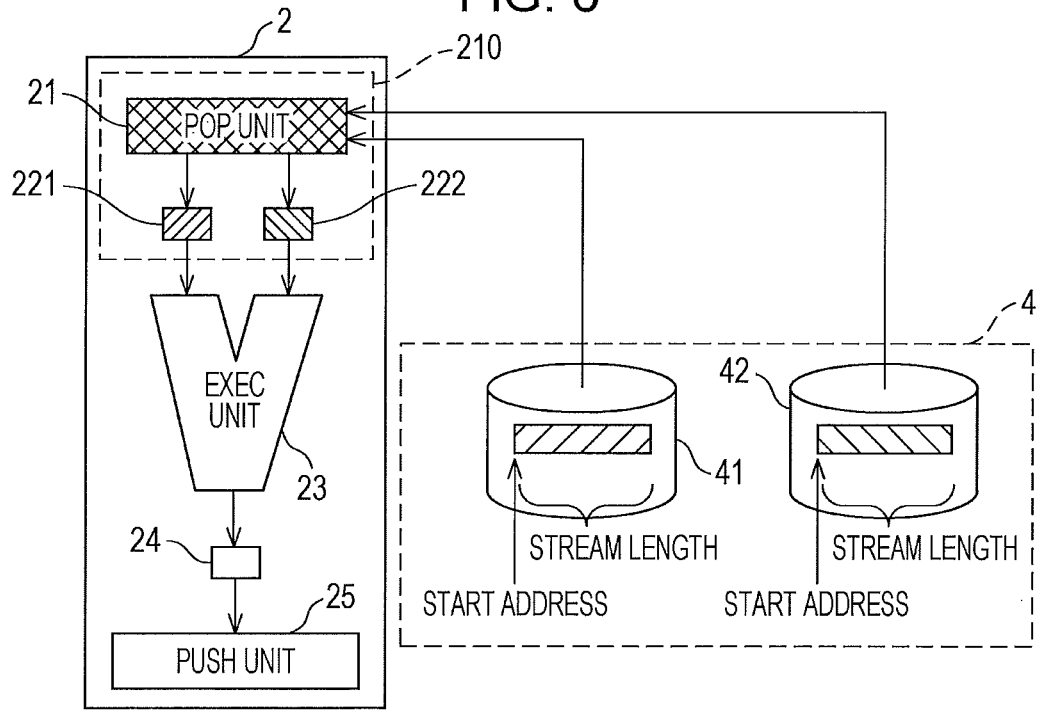
FIG. 6 is a diagram illustrating an example of an operation of a reading circuit in the arithmetic processing device according to the present embodiment.
Figure 7:
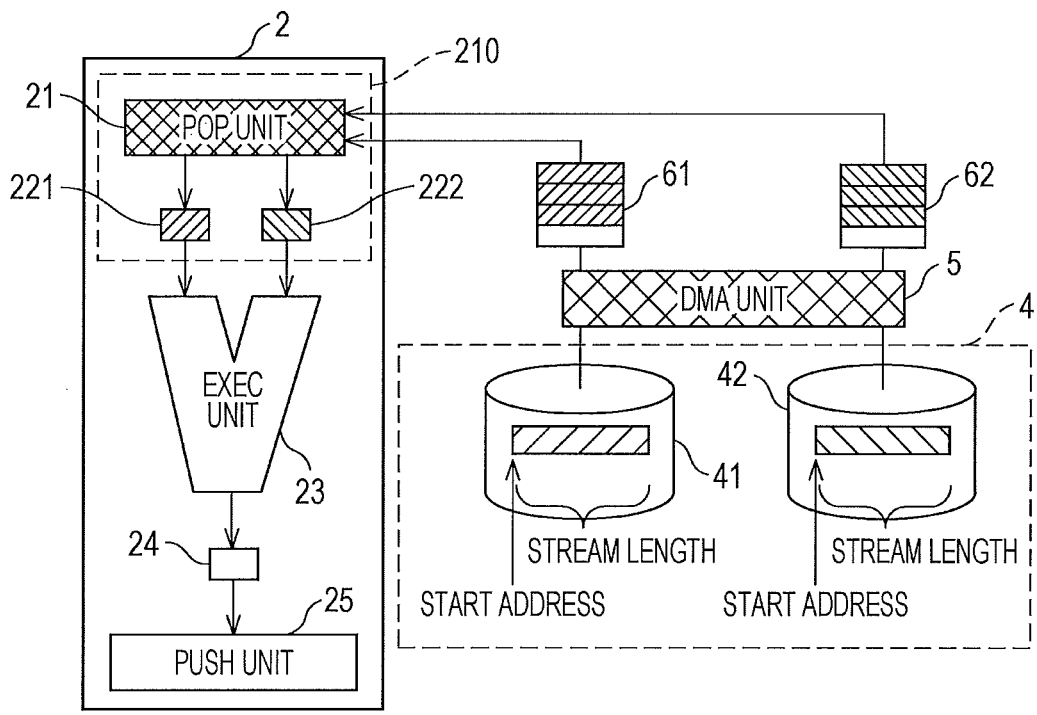
FIG. 7 is a diagram illustrating another example of the reading circuit in the arithmetic processing device according to the present embodiment.

FIG. 6 is a diagram illustrating an example of an operation of a reading circuit in the arithmetic processing device according to the present embodiment, and FIG. 7 is a diagram illustrating another example of the reading circuit in the arithmetic processing device according to the present embodiment.

As illustrated in FIGS. 6 and 7, a reading circuit 210 includes a pop unit 21 and registers 221 and 222, and a data memory 4 includes memory portions 41 and 42. The memory portions 41 and 42 represent, for example, banked memory areas at different addresses (start addresses) in the data memory 4 and may, needless to say, include any number of memories other than two memories.

As illustrated in FIG. 6, the pop unit 21 in the reading circuit 210 reads first data from the memory portion (a first bank) 41 in the data memory 4 by specifying the start address and a stream length and stores the read first data in the register 221.

In addition, the pop unit 21 in the reading circuit 210 reads second data from the memory portion (a second bank) 42 in the data memory 4 by specifying the start address and a stream length and stores the read second data in the register 222. The processing of the reading circuit 210 corresponds to, for example, the above-described process P21 in the arithmetic processing device described above and illustrated in FIG. 3.

That is, the pop unit 21 reads stream data from the data memory 4, inputs (stores) the stream data to (in) the registers (pipeline registers) 221 and 222 between a reading stage (the pop unit 21) and an execution stage (the exec unit 23) for the stream processing, and executes pipeline processing.

Thus, for example, specifying the start address and the stream length to read stream data from the data memory 4, banked into the first bank 41 and the second bank 42, makes it possible to reduce the number of memory ports and to minimize the cycle overhead.

As illustrated in FIG. 7, for example, data read from the memory portions (the first and second banks) 41 and 42 by direct memory access (DMA) unit 5 may also be supplied to the reading circuit 210 through first-in first-out (FIFO) buffers 61 and 62. That is, transferring of data from the data memory 4 may also be left to the DMA unit 5 to extract read data from the FIFO buffers 61 and 62.

Figure 8:
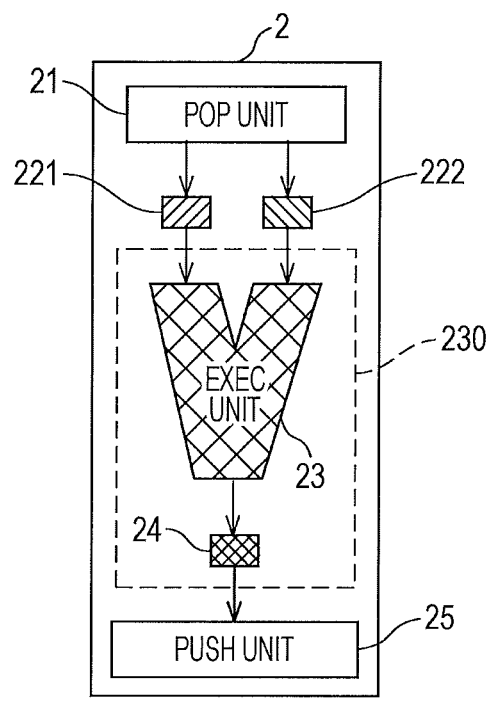
FIG. 8 is a diagram illustrating an example of an operation of an executing circuit in the arithmetic processing device according to the present embodiment.

FIG. 8 is a diagram illustrating an example of an operation of an executing circuit in the arithmetic processing device 1 according to the present embodiment. As illustrated in FIG. 8, an executing circuit 230 includes an exec unit 23 and a register 24.

The exec unit 23 in the executing circuit 230 executes stream processing on data written to the registers 221 and 222 and writes an arithmetic-operation result thereof to the register 24. The processing of the executing circuit 230 corresponds to, for example, the process P22 in the arithmetic processing device 1 described above and illustrated in FIG. 3.

That is, the exec unit 23 executes stream processing on data input to the registers 221 and 222, inputs an arithmetic-operation result thereof to the register (pipeline register) 24 between the exec unit 23 and the push unit 25 and executes pipeline processing.

Figure 9:
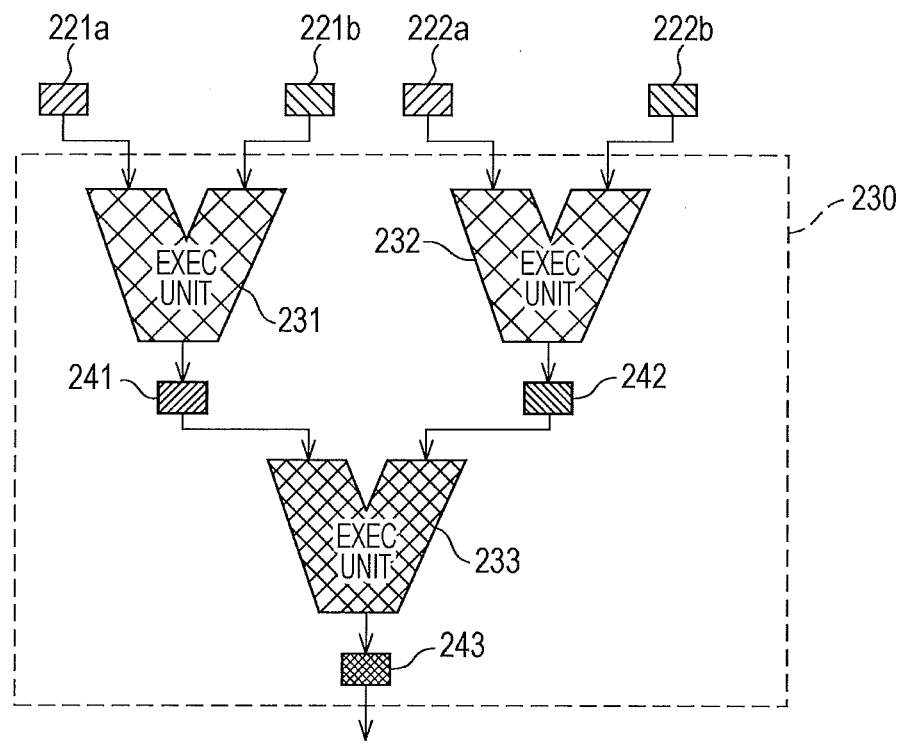
FIG. 9 is a diagram illustrating another example of the operation of the executing circuit in the arithmetic processing device according to the present embodiment.

FIG. 9 is a diagram illustrating another example of the operation of the executing circuit in the arithmetic processing device 1 according to the present embodiment. In this example, this executing circuit 230 is constituted by exec units 231 to 233 and registers 241 to 243 in multiple stages.

In this case, four registers 221a and 221b and 222a and 222b are provided in the reading circuit 210 so as to correspond to two exec units 231 and 232.

Three registers 241 to 243 are also provided in the executing circuit 230 in order to store arithmetic-operation results obtained by the three exec units 231 to 233. The executing circuit 230 illustrated in FIG. 9 is merely an example, and it goes without saying that various other configurations may also be used.

Thus, the executing circuit 230 (the data bus of the arithmetic unit) may have a multi-stage configuration. With this configuration, an arithmetic-operation result may be input to the register (pipeline register) 243 between the exec unit 233 and a push unit 25 to execute pipeline processing.

Figure 10:
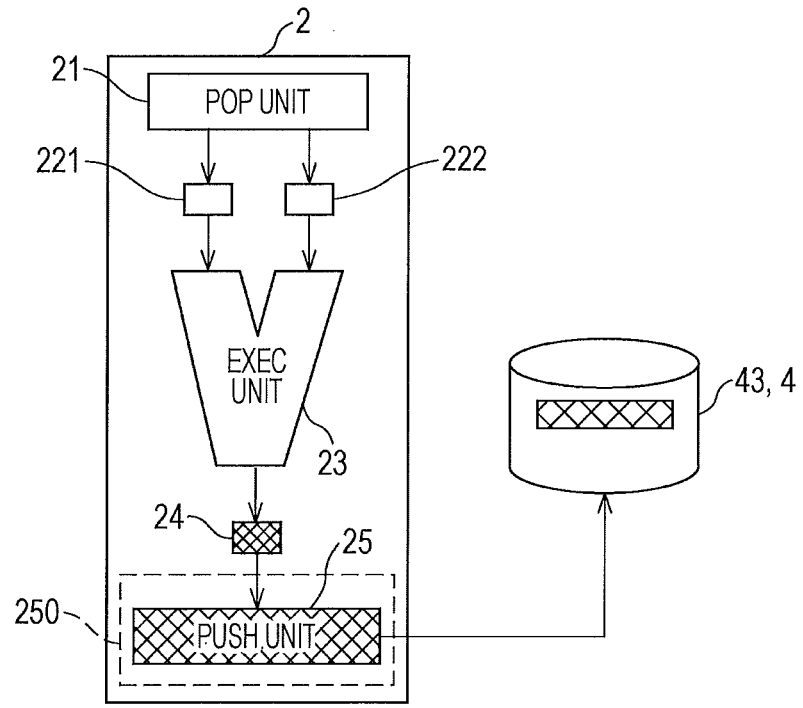
FIG. 10 is a diagram illustrating an example of the operation of a writing circuit in the arithmetic processing device according to the present embodiment.
Figure 11:
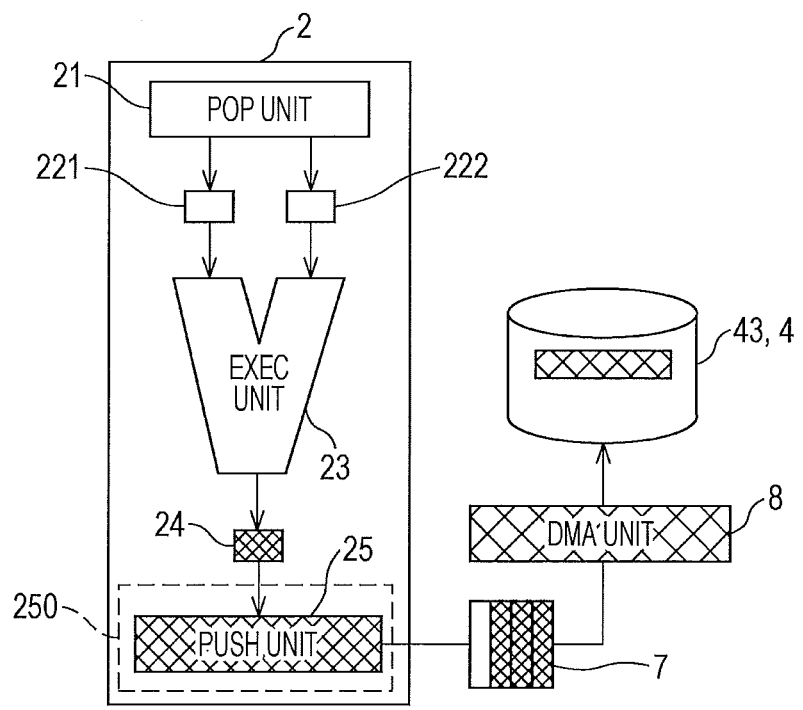
FIG. 11 is a diagram illustrating another example of the operation of the writing circuit in the arithmetic processing device according to the present embodiment.

FIG. 10 is a diagram illustrating an example of the operation of a writing circuit in the arithmetic processing device 1 according to the present embodiment, and FIG. 11 is a diagram illustrating another example of the operation of the writing circuit in the arithmetic processing device 1 according to the present embodiment.

As illustrated in FIG. 10, a writing circuit 250 includes a push unit 25 and writes the arithmetic-operation result stored in a register 24 to a memory portion 43 in a data memory 4. That is, the writing circuit 250 extracts output data from the pipeline register 24 between the exec unit 23 and the push unit 25 and writes the output data to, for example, a memory area indicated by a start address and a stream length.

The processing of the writing circuit 250 corresponds to, for example, the process P23 in the arithmetic processing device 1 described above and illustrated in FIG. 3. In this case, the memory unit 43 may be, for example, a memory area that is different from the memory portions 41 and 42 in the data memory 4.

The writing circuit 250 illustrated in FIG. 10 directly writes the arithmetic-operation result, stored in the register 24, to the memory portion 43. In contrast, a writing circuit 250 illustrated in FIG. 11 writes an arithmetic-operation result, stored in a register 24, to a FIFO buffer 7, and a DMA unit 8 transfers the data, written to the FIFO buffer 7, to a memory portion 43.

That is, the writing circuit 250 illustrated in FIG. 11 is adapted to sequentially write the arithmetic-operation results, stored in the register 24, to the FIFO buffer 7 and to leave the data transfer from the FIFO buffer 7 to the memory portion 43 (a data memory 4) to the DMA unit 8.

Figure 12:
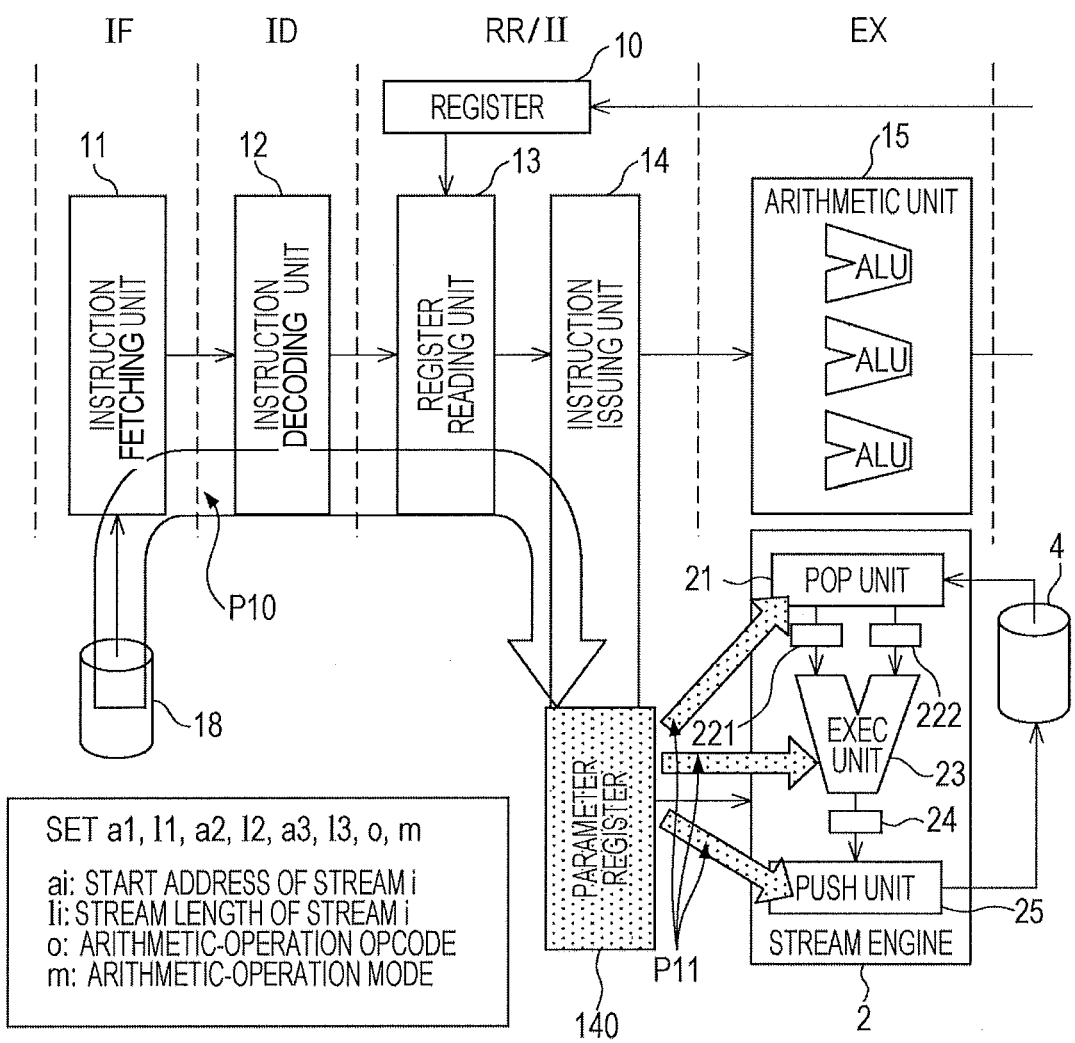
FIG. 12 is a diagram illustrating an example of parameter information in the arithmetic processing device according to the present embodiment.

FIG. 12 is a diagram illustrating an example of the parameter information in the arithmetic processing device 1 according to the present embodiment. The parameter information used in the stream processing may be represented by, for example, the start address (ai) of each stream (i), a stream length (li), an arithmetic-operation opcode (o), and an arithmetic-operation mode (m), and a single large-bit-length set instruction (a set instruction: set).

The set instruction (the parameter information) is read from the instruction memory 18 and is assigned to (set in) a parameter register 140 at once, as indicated by reference character P10. The pipeline stages (the pop unit 21, the exec unit 23, and the push unit 25) refer to the parameter information in the parameter register 140 to perform pipeline execution, as indicated by reference character P11.

Figure 13:
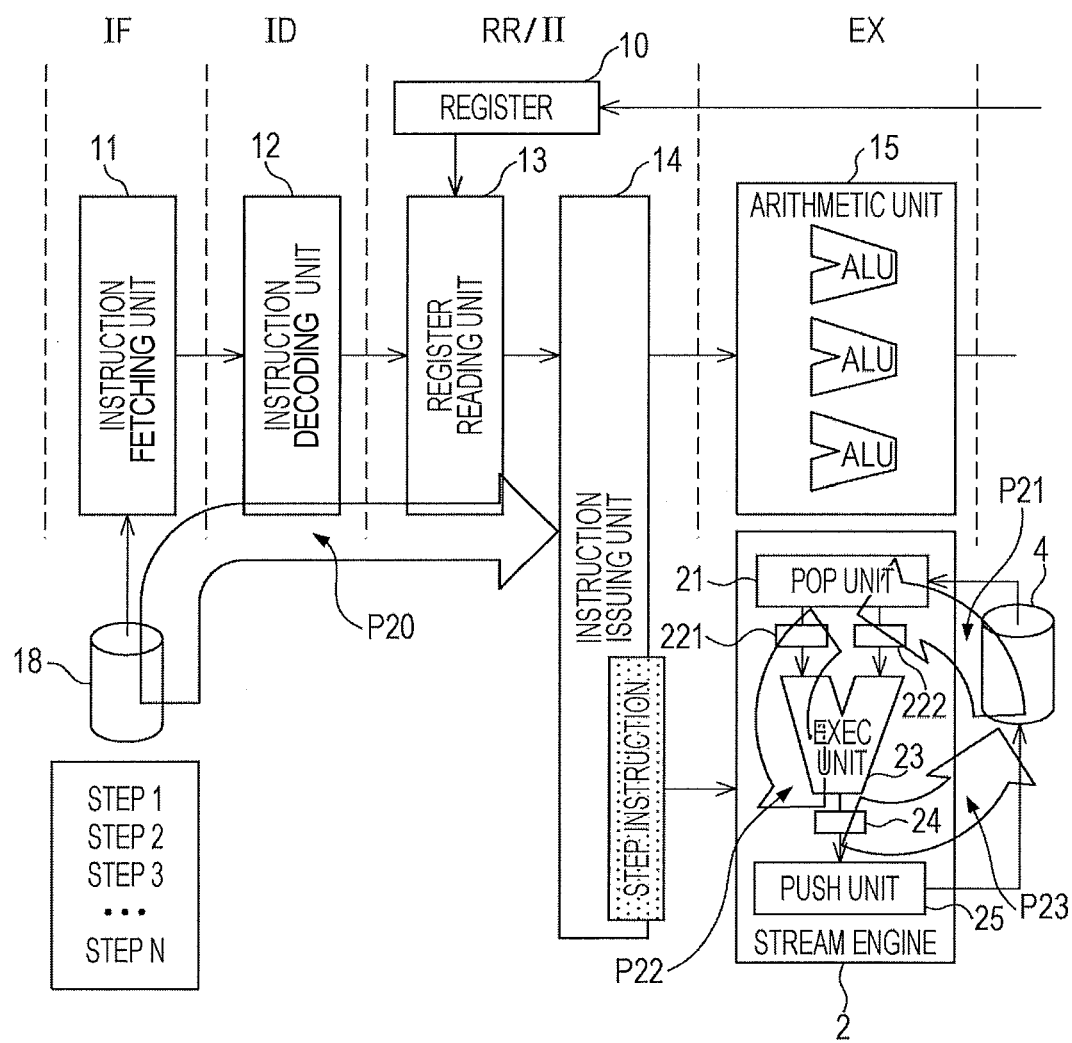
FIG. 13 is a diagram (part 1) illustrating step instructions in the arithmetic processing device according to the present embodiment.
Figure 14A:
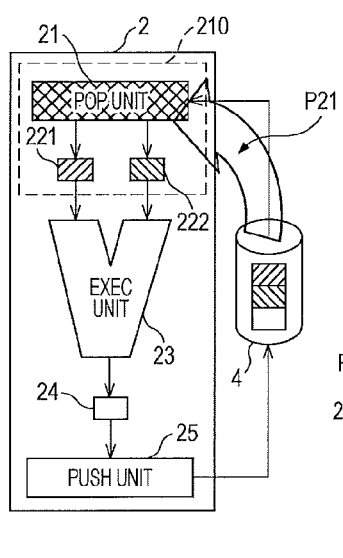
FIGS. 14A to 14C are a diagrams (part 2) illustrating step instructions in the arithmetic processing device according to the present embodiment.
Figure 14B:
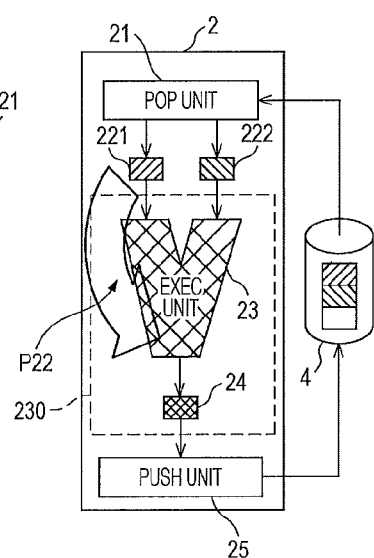
Figure 14C:
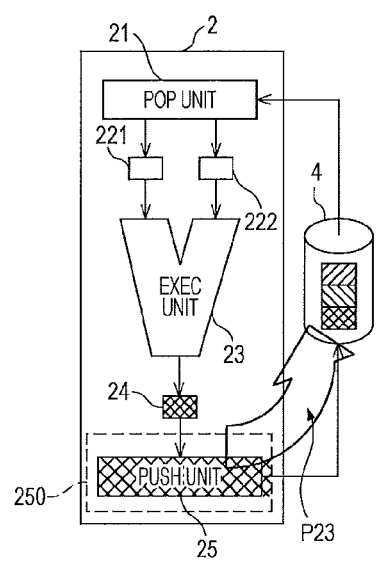

FIGS. 13 to 14C are diagrams illustrating step instructions in the arithmetic processing device 1 according to the present embodiment. As illustrated in FIGS. 13 to 14C, according to the arithmetic processing device (the stream engine 2) in the present embodiment, it is possible to perform control in accordance with the set instruction.

That is, step instructions are read from the instruction memory 18, as indicated by reference character P20, and are executed to thereby make it possible to control the processes P21 to P23 in the respective pipeline stages in the stream engine 2. The step instructions are, for example, instructions created by a programmer in advance.

In this example, step instructions "steps 1 to N" are read from the instruction memory 18 in order and are issued from the instruction issuing unit 14 to the stream engine 2, and the pipeline processes P21 to P23 are executed.

As illustrated in FIG. 13, the step instructions are issued from the instruction issuing unit 14 to the stream engine 2, and the pop unit 21, the exec unit 23, and the push unit 25 execute corresponding processes (P21, P22, and P23) in accordance with the respective step instructions.

That is, as illustrated in FIG. 14A, the process P21 is a process in which the pop unit 21 reads data from the data memory 4 and writes the data to the registers 221 and 222. As illustrated in FIG. 14B, the process P22 is a process in which the exec unit 23 executes stream processing on the data written to the registers 221 and 222 and writes the resulting data to the register 24.

In addition, as illustrated in FIG. 14C, the process P23 is a process in which the push unit 25 writes the data, written to the register 24, to the data memory 19. These processes P21 to P23 are subjected to pipeline execution in accordance with the step instructions issued from the instruction issuing unit 14.

Figure 15:
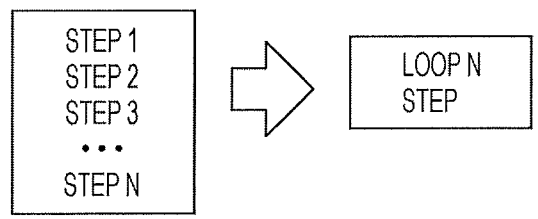
FIG. 15 is a diagram illustrating a modification of the step instructions in the arithmetic processing device according to the present embodiment.

FIG. 15 is a diagram illustrating a modification of the step instructions in the arithmetic processing device 1 according to the present embodiment. In the case described above with reference to FIG. 13, N step instructions "steps 1 to N" are read directly from the instruction memory 18 and are issued from the instruction issuing unit 14 to the stream engine 2.

In contrast, in the modification illustrated in FIG. 15, set instructions are combined with an instruction (a zero-overhead loop instruction) dedicated to loop processing for efficiently executing a continuously repeated process (loop processing).

That is, combining N step instructions "steps 1 to N" with a zero-overhead loop instruction (loop N step) makes it possible to suppress an increase in the number of instruction sequences. In the case of the zero-overhead loop instruction, for example, when an interrupt occurs, the processing of a stream is immediately stopped in a step being executed.

Figure 16:
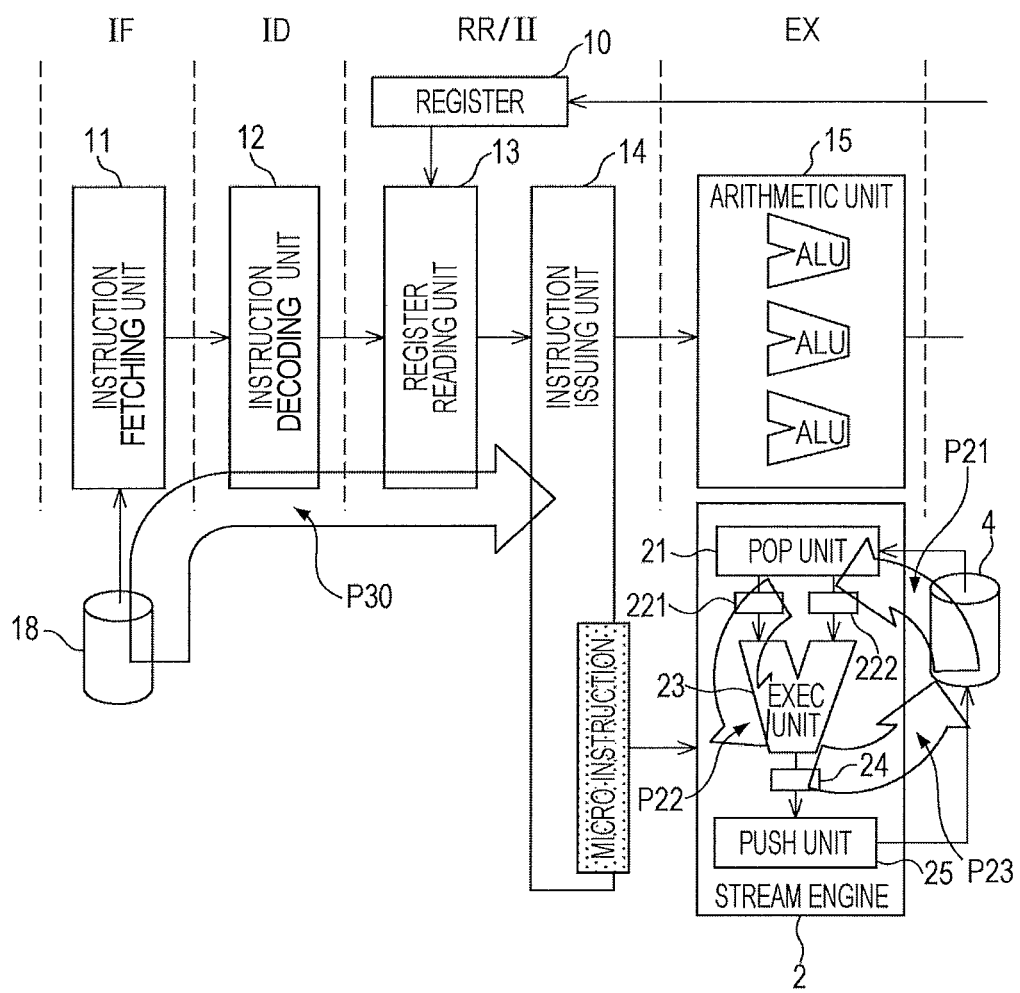
FIG. 16 is a diagram (part 1) illustrating micro instructions in the arithmetic processing device according to the present embodiment.
Figure 17A:
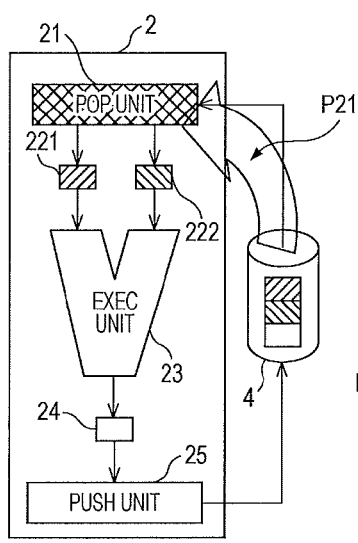
FIG. 17A to 17C are diagrams (part 2) illustrating micro instructions in the arithmetic processing device according to the present embodiment.
Figure 17B:
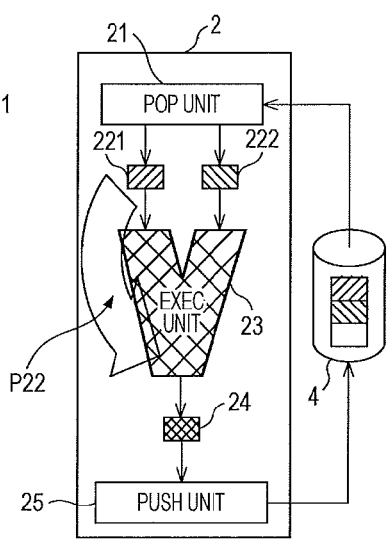
Figure 17C:
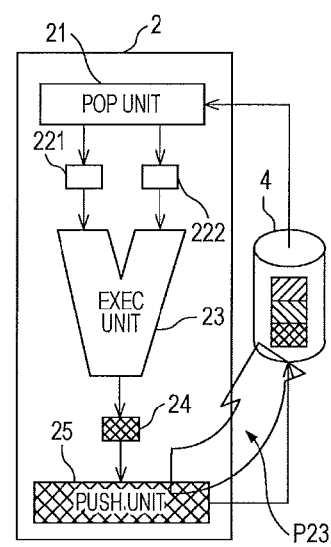

FIGS. 16 to 17C are diagrams illustrating micro instructions in the arithmetic processing device according to the present embodiment. As illustrated in FIG. 16, instructions issued from the instruction issuing unit 14 to the stream engine 2 are micro instructions.

That is, as indicated by reference character P30 illustrated in FIG. 16, the arithmetic processing device according to the present embodiment is adapted such that micro instructions are read from the instruction memory 18 and are executed to control processes P21 to P23 in the respective pipeline stages in the stream engine 2.

For example, a pop instruction is assigned to the process P21 illustrated in FIG. 17A, an exec instruction is assigned to the process P22 illustrated in FIG. 17B, a push instruction is assigned to the process P23 illustrated in FIG. 17C, and the processes P21 to P23 are executed according to the micro instructions. This arrangement allows the processes P21 to P23 in the respective pipeline stages to be individually controlled according to the micro instructions.

Figure 18A:
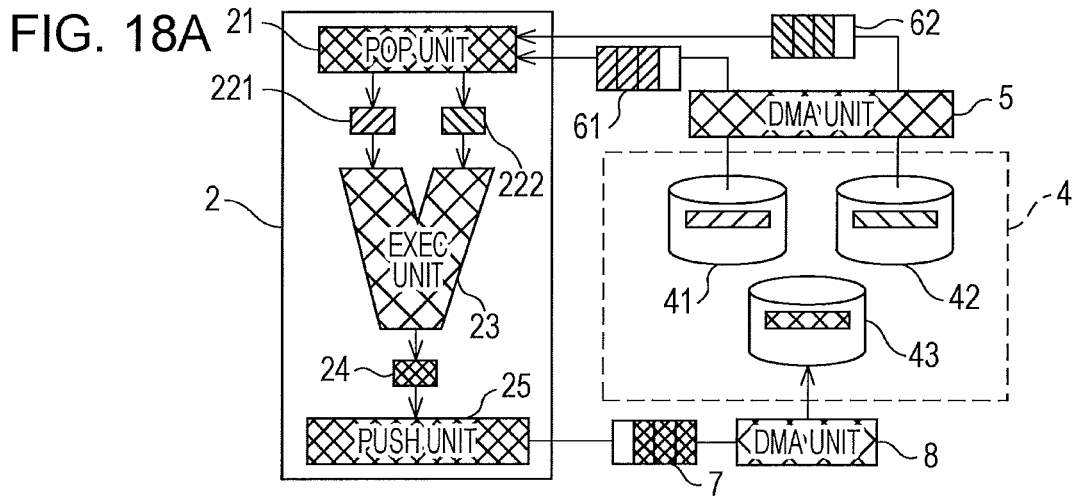
FIGS. 18A to 18C are diagrams illustrating access control according to micro instructions in the arithmetic processing device according to the present embodiment.
Figure 18B:
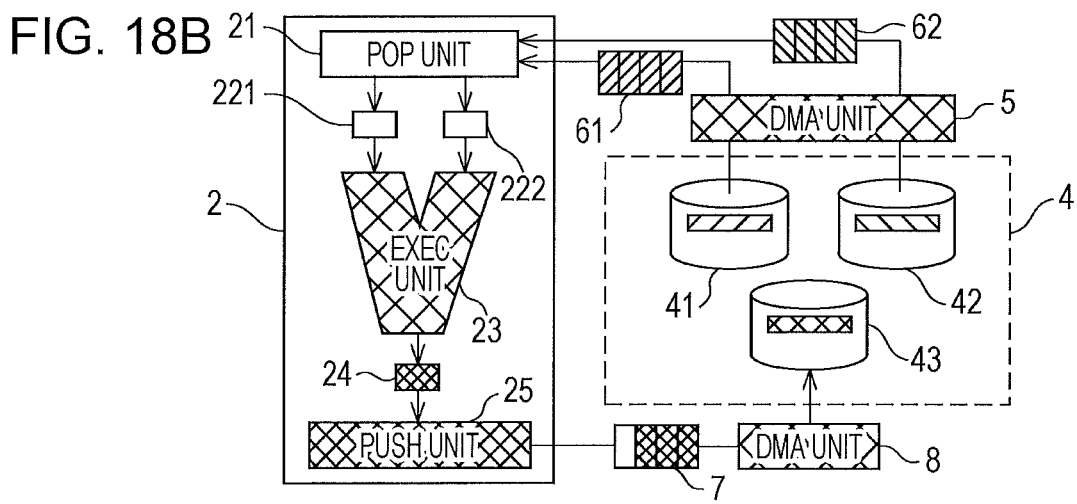
Figure 18C:
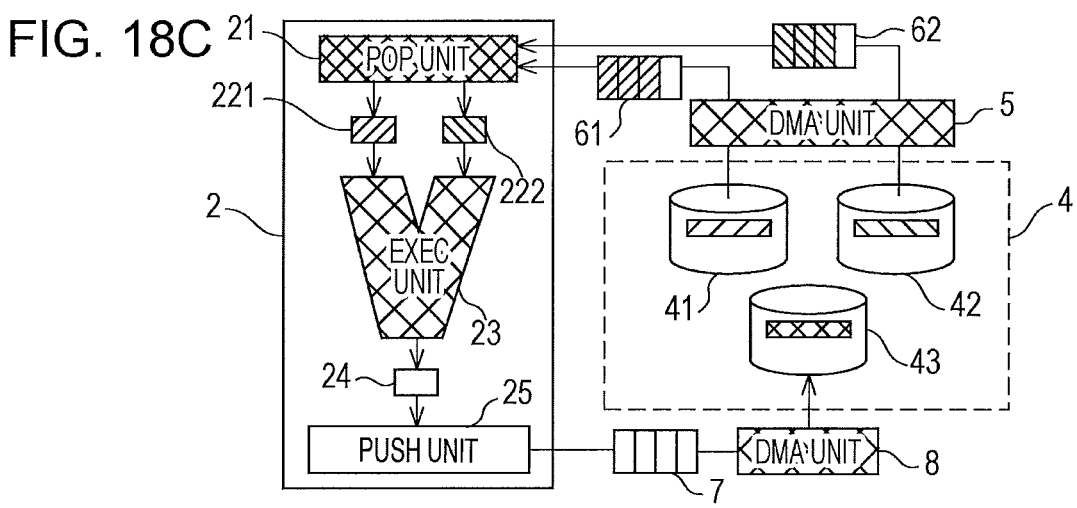

FIGS. 18A to 18C are diagrams illustrating access control according to micro instructions in the arithmetic processing device according to the present embodiment.

In this case, FIG. 18A illustrates a case in which all of a pop instruction, an exec instruction, and a push instruction are issued, FIG. 18B illustrates a case in which a pop instruction is stopped, and FIG. 18C illustrates a case in which a push instruction is stopped. The arithmetic processing device includes DMA units 5 and 8 and FIFO buffers 61, 62, and 7, similarly to the configurations illustrated in FIGS. 7 and 11.

First, as illustrated in FIG. 18A, when all of the pop instruction, the exec instruction, and the push instruction are issued, processes P21 to P23 in the respective pipeline stages are executed at corresponding cycles.

Next, as illustrated in FIG. 18B, when the pop instruction is stopped, that is, when only the exec instruction and the push instruction are executed, the pop unit 21 stops the reading of data from the FIFO buffers 61 and 62.

As a result of data transfer performed by the DMA unit (input DMA unit) 5, the FIFO buffers 61 and 62 are filled up, and the DMA unit 5 detects the fill-up states of the FIFO buffers 61 and 62 and makes an automatic stop. That is, by stopping the pop instruction, which is a micro instruction, it is possible to stop the pipeline processing of the stream engine 2.

In addition, as illustrated in FIG. 18C, when the push instruction is stopped, that is, only when the pop instruction and the exec instruction are executed, the push unit 25 stops the operation for reading data from the register 24 and storing the data in the FIFO buffer 7.

As a result, the FIFO buffer 7 becomes empty and the DMA (output DMA) unit 8 detects the empty state of the FIFO buffer 7 and makes an automatic stop. That is, by stopping the push instruction, which is a micro instruction, it is possible to stop the pipeline processing of the stream engine 2.

The use of the micro instructions, namely, the pop instruction, the exec instruction, and the push instruction, allows the DMA units 5 and 8 to autonomously control memory access, for example, even when an interrupt occurs. That is, it is possible to simplify control of data transfer between the memory 19 and the arithmetic unit 15, thus making it possible to reduce the amount of hardware for memory access control.

Figure 19:
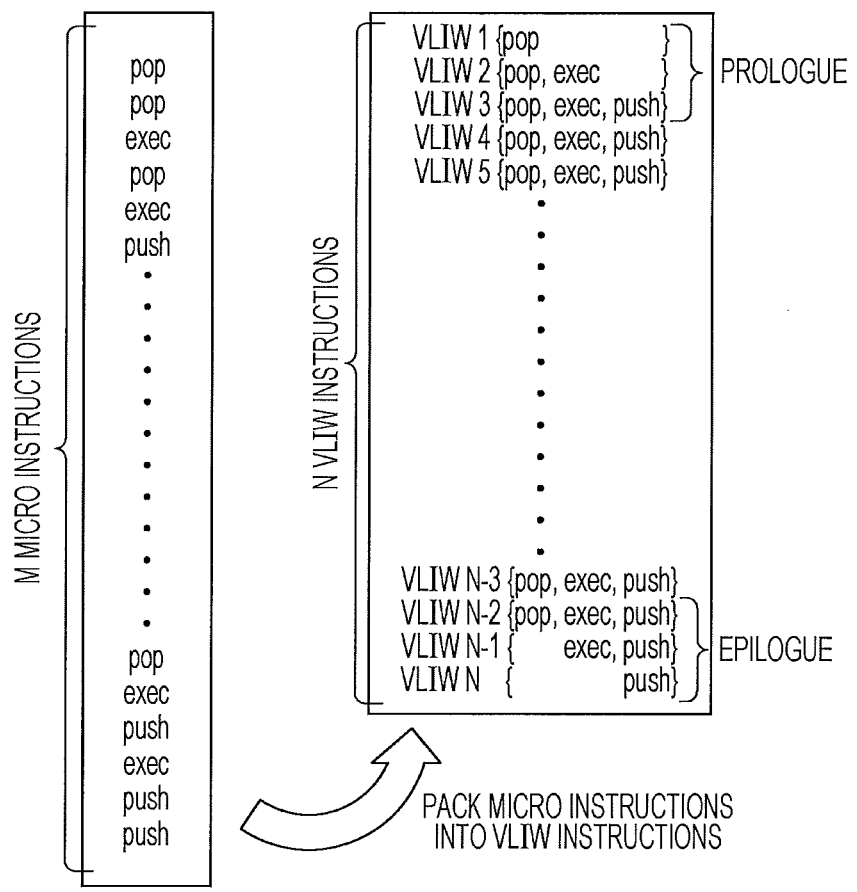
FIG. 19 illustrates a state in which micro instructions in the arithmetic processing device according to the present embodiment are embedded in VLIW instructions.

FIG. 19 illustrates a state in which micro instructions in the arithmetic processing device according to the present embodiment are embedded in (packed into) VLIW instructions. As described above with reference to FIGS. 16 to 18C, when micro instructions are used, for example, embedding the micro instructions in very long instruction word (VLIW) instructions makes it possible to execute individual processes at the same time, thereby making it possible to reduce the number of execution cycles.

That is, embedding a plurality of micro instructions in VLIW instructions makes it possible to reduce the number of instructions in the loop processing and further makes it possible to reduce the number of execution cycles in the loop. Such an arrangement also makes it possible to effectively use the instruction set architecture of the base processor (which may be a VLIW processor, in the arithmetic processing device 1).

FIG. 19 illustrates a state in which M micro instructions are packed into N VLIW instructions. Now, prologue processing according to a VLIW 1 instruction to a VLIW 3 instruction and epilogue processing according to a VLIW N-2 instruction to a VLIW N instruction will be described with reference to FIGS. 20A to 21C.

Figure 20A:
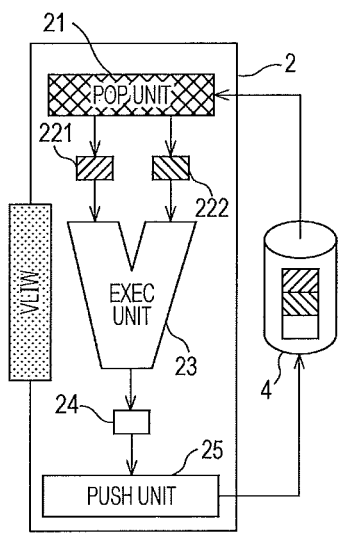
FIGS. 20A to 20C are diagrams illustrating prologue processing according to the VLIW instructions illustrated in FIG. 19.
Figure 20B:
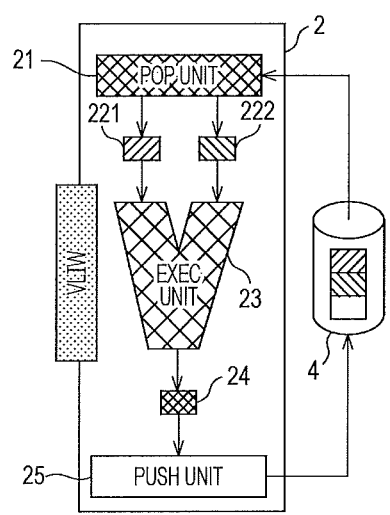
Figure 20C:
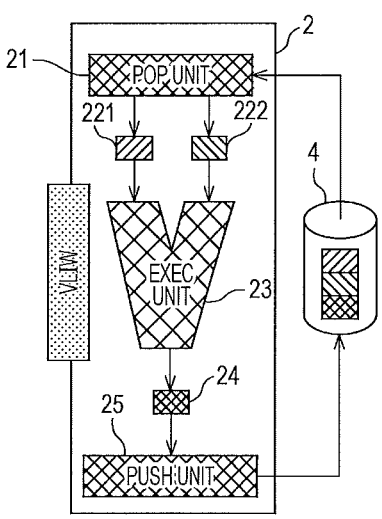

FIGS. 20A to 20C are diagrams illustrating prologue processing according to the VLIW instructions illustrated in FIG. 19. More specifically, FIG. 20A illustrates processing according to the VLIW 1 instruction, FIG. 20B illustrates processing according to the VLIW 2 instruction, and FIG. 20C illustrates processing according to the VLIW 3 instruction.

As illustrated in FIG. 19, the prologue processing is processing for activating the stream engine 2 and is realized by executing three instructions, namely, VLIW 1 [pop], VLIW 2 [pop, exec], and VLIW 3 [pop, exec, push].

First, as illustrated in FIG. 20A, only a pop instruction, which is a VLIW 1 instruction, is executed. That is, the process P21 in which the pop unit 21 reads data from the data memory 4 and writes the data to the registers 221 and 222 is executed according to the pop instruction. As a result, the data on which the exec unit 23 is to perform arithmetic operation processing is input to the registers 221 and 222.

Next, as illustrated in FIG. 20B, the pop instruction and the exec instruction, which are included in the VLIW 2 instruction, are executed. That is, the process P21 is executed according to the pop instruction, and also the process P22 in which the exec unit 23 executes stream processing on the data written to the registers 221 and 222 and writes the resulting data to the register 24 is executed according to the exec instruction.

As a result, the data that the exec unit 23 is to perform arithmetic operation processing is input to the registers 221 and 222 and the arithmetic-operation-result data the push unit 25 is to write to the data memory 4 is input to the register 24.

As illustrated in FIG. 20C, the pop instruction, the exec instruction, and the push instruction, which are included in the VLIW 3 instruction, are executed. The process P21 is executed according to the pop instruction, the process P22 is executed according to the exec instruction, and the process P23 in which the push unit 25 writes the arithmetic-operation-result data, written to the register 24, to the data memory 4 is further executed according to the push instruction.

In the processing from the above-described epilogue processing to epilogue processing described below with reference to FIG. 21, pipeline processing involving processes P21 to P23 is continuously executed according to instructions (a VLIW 4 instruction, a VLIW 5 instruction, . . . ) that may be the same as the VLIW 3 instruction.

Figure 21A:
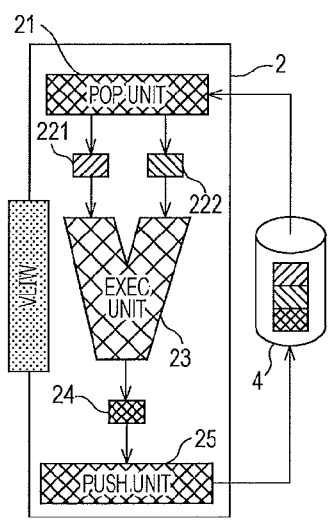
FIGS. 21A to 21C are diagrams illustrating epilogue processing according to the VLIW instructions illustrated in FIG. 19.
Figure 21B:
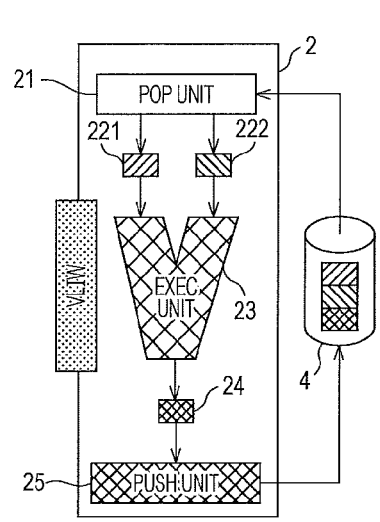
Figure 21C:
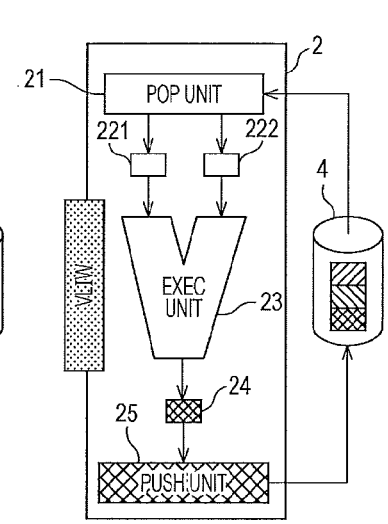

FIGS. 21A to 21C are diagrams illustrating epilogue processing according to the VLIW instructions illustrated in FIG. 19. More specifically, FIG. 21A illustrates processing according to the VLIW N-2 instruction, FIG. 21B illustrates processing according to the VLIW N-1 instruction, and FIG. 21C illustrates processing according to the VLIW N instruction.

As illustrated in FIG. 19, the epilogue processing is processing for stopping the stream engine 2 in operation, the epilogue processing being opposite to the prologue processing described above with reference to FIGS. 20A to 20C. The epilogue processing is realized by executing three instructions, namely, VLIW N-2 [pop, exec, push], VLIW N-1 [exec, push], and VLIW N [push].

First, as illustrated in FIG. 21A, the pop instruction, the exec instruction, and the push instruction, which are included in the VLIW N-2 instruction, are executed. The VLIW N-2 instruction may be the same as the VLIW 3 instruction described above with reference to FIG. 20C, that is, the instructions in the pipeline processing continuously executed in the processes P21 to P23.

Next, as illustrated in FIG. 21B, an exec instruction and a push instruction, which are included in the VLIW N-1 instruction, are executed. That is, since the pop instruction is omitted, the process P21 in which the pop unit 21 reads data from the data memory 4 and writes the data to the registers 221 and 222 is stopped. As a result, the registers 221 and 222 become empty.

Subsequently, as illustrated in FIG. 21C, only the push instruction, which is included in the VLIW N instruction, is executed. That is, since the pop instruction and the exec instruction are omitted, not only the registers 221 and 222 but also the register 24 becomes empty.

Controlling the stream engine 2 in accordance with the three micro instructions, namely, the pop instruction, the exec instruction, and the push instruction is merely an example, and it goes without saying that various changes may be made. For example, another micro instruction may be added or a different micro instruction may be used.

Although the arithmetic processing device that performs matrix arithmetic operation processing in LTE Advanced or the like has been described in by way of example, the present embodiment is not only limited to such an arithmetic processing device applied to wireless communication devices but is also widely applicable to various arithmetic processing devices.

All examples and conditions described in the above embodiment are intended to facilitate understanding of technical concepts applied to the present disclosure and technology, and are not intended to particularly limit the scope of the present disclosure. Also, such descriptions herein are not intended to indicate advantages and disadvantages of the present disclosure. Although the embodiment of the present disclosure has been described in detail, it is to be understood that various changes, substitutions, and modifications are possible without departing from the spirit and scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An arithmetic processing device comprising:
   an arithmetic unit configured to execute an arithmetic operation;
   a stream engine configured to execute stream processing; and
   an instruction issuing unit, coupled to the arithmetic unit and the stream engine, configured to issue, at a stage of pipeline stages, a first instruction to the arithmetic unit and a second instruction to the stream engine,
   wherein the stream engine includes:
     a pop unit, coupled between a memory and a first register, configured to read data from the memory and write the data in the first register;
     an exec unit, coupled between the first register and a second register, configured to execute stream processing on the data in the first register and write resulting data in the second register; and
     a push unit, coupled between the second register and the memory, configured to write the resulting data in the second register in the memory.

2. The arithmetic processing device according to claim 1, wherein
   the pop unit reads the data from a first memory portion included in the memory and indicated by a start address and a stream length and writes the data to the first register.

3. The arithmetic processing device according to claim 1, wherein the exec unit includes a plurality of layered exec units and a plurality of third registers provided between the plurality of layered exec units.

4. The arithmetic processing device according to claim 1, wherein
   the push unit writes the resulting data, stored in the second register, to a second memory portion included in the memory and indicated by a start address and a stream length.

5. The arithmetic processing device according to claim 1, wherein the second instruction is a step instruction, and the stream engine executes the step instruction at each of the pipeline stages.

6. The arithmetic processing device according to claim 1, wherein parameter information is used in the stream processing and is represented by a single large-bit-length set instruction.

7. The arithmetic processing device according to claim 6, wherein the parameter information used in the stream processing includes a start address of each stream, a stream length, and an arithmetic operation mode.

8. The arithmetic processing device according to claim 5, further comprising:
   a parameter register in which parameter information used for the stream processing is set at once,
   wherein each of the pipeline stages in the stream engine refers to the parameter information in the parameter register to perform pipeline execution.

9. The arithmetic processing device according to claim 1, wherein the second instruction includes small-bit-length micro instructions for controlling the corresponding pipeline stages of the stream engine, the small-bit-length micro instructions being obtained by separating step instructions, and
   each pipeline stage independently executes processing in accordance with the corresponding micro instruction.

10. The arithmetic processing device according to claim 9, further comprising:
    a first first-in first-out (FIFO) buffer provided between the memory and the pop unit,
    wherein the memory is subjected to direct memory access (DMA) control, and a first micro instruction for controlling processing of the pop unit is stopped to fill up the first FIFO buffer and to stop pipeline processing of the stream engine.

11. The arithmetic processing device according to claim 9, further comprising:
    a second FIFO buffer provided between the push unit and the memory,
    wherein the memory is subjected to direct access memory (DMA) control, and a second micro instruction for controlling processing of the push unit is stopped to empty the second FIFO buffer and to stop pipeline processing of the stream engine.

12. The arithmetic processing device according to claim 9,
    wherein, when the arithmetic unit is controlled in accordance with a very long instruction word (VLIW) instruction, a micro instruction for controlling an operation in each pipeline stage in the stream engine is packed in the VLIW instruction.

* * * * *